Jan. 1, 1924
R. E. FOSDICK
DETECTOSCOPE
Filed Sept. 20, 1920 2 Sheets-Sheet 2
1,479,036
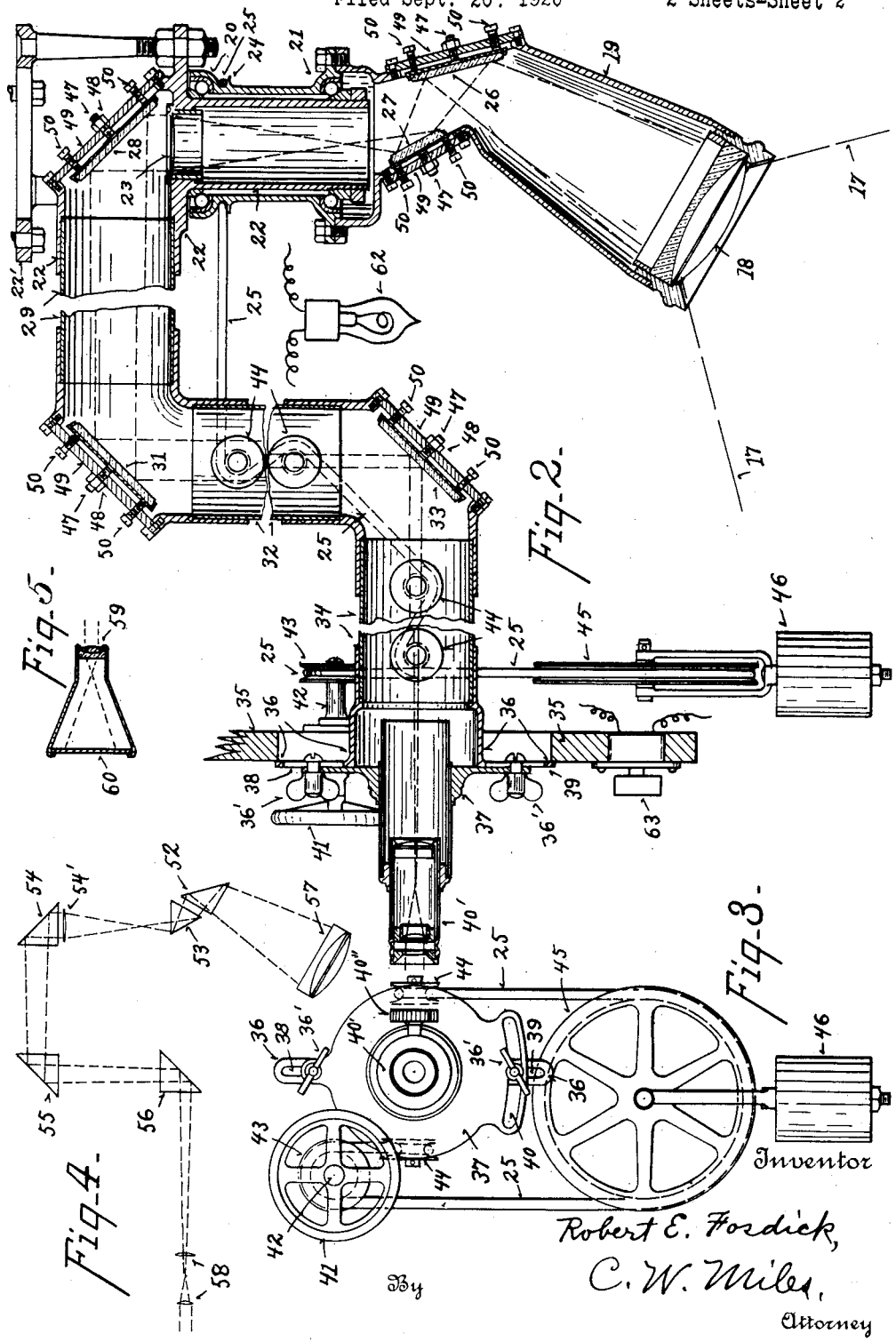

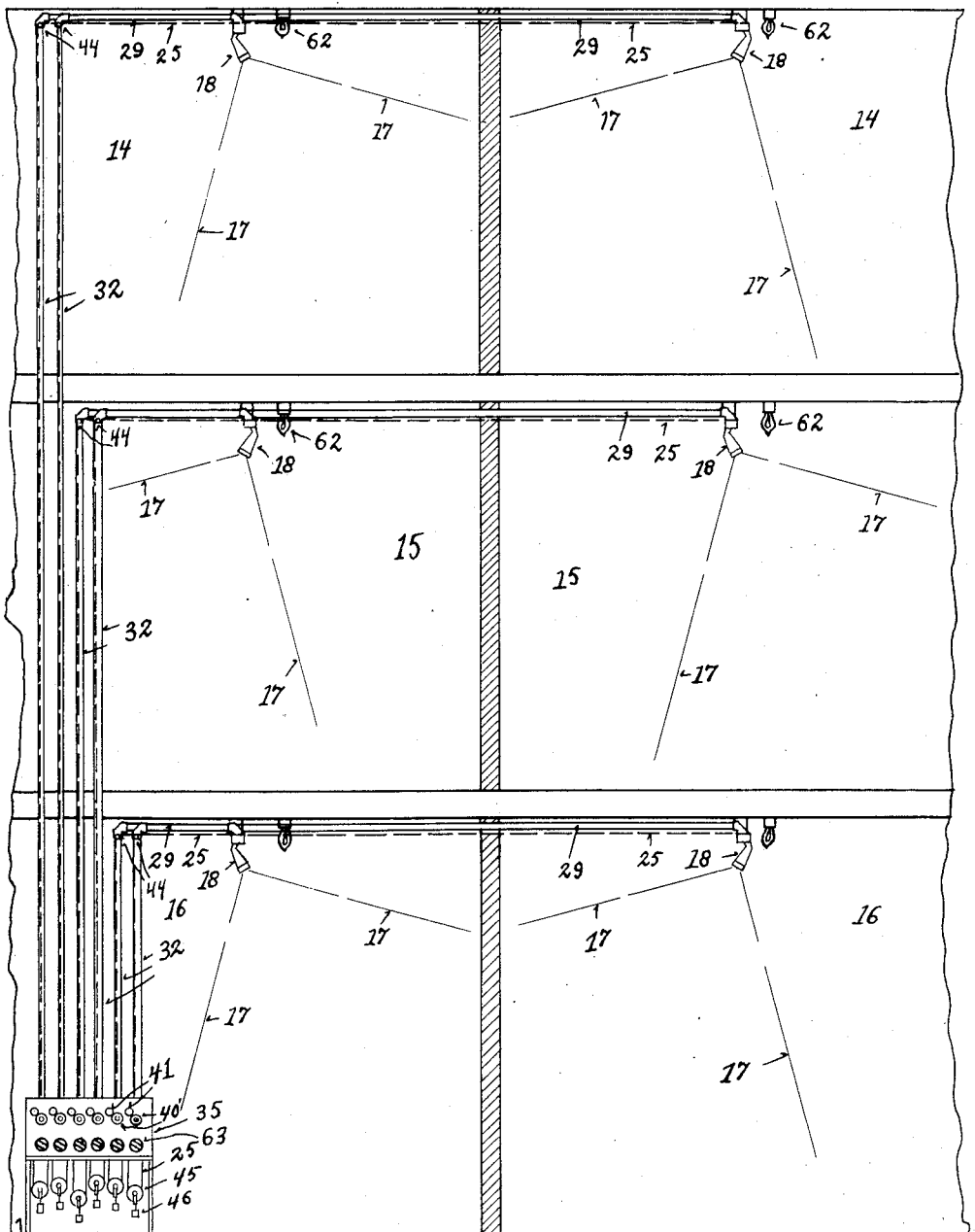

Patented Jan. 1, 1924.

1,479,036

UNITED STATES PATENT OFFICE.

ROBERT E. FOSDICK, OF CINCINNATI, OHIO.

DETECTOSCOPE.

Application filed September 20, 1920. Serial No. 411,579.

*To all whom it may concern:*

Be it known that I, ROBERT E. FOSDICK, a citizen of the United States, residing at Cincinnati, in the county of Hamilton and State of Ohio, have invented certain new and useful Improvements in Detectoscopes, of which the following is a specification.

My invention relates to improvements in observation apparatus to enable the management of department stores for instance to keep the various departments under observation and thereby avoid serious losses by theft and similar causes. One of its objects is to provide improved apparatus which will enable various rooms and departments to be observed from an observation point common to all. Another object is to provide improved means to enable several departments or sections of a room or floor to be observed through a single observation instrument. Another object is to provide improved wide angle observing apparatus, adapted to make observations from a distance. Another object is to provide improved adjusting means for the adjustment of the observation apparatus into alignment for the transmission and reception of light rays over a considerable distance, including their transmission where required over paths of different angularity. Another object is to provide illumination of the objects or sections under observation, under control of the observer at the point of observation. Another object is to provide for taking permanent or photographic records of the objects where required. Another object is to provide for throwing the images of two or more objects at the same time upon an observation screen adjacent to each other, whereby a general supervision of a series of objects may be maintained and specific attention given to any one thereof when suspicious circumstances may arise. My invention also comprises certain details of form, combination, and arrangement, all of which will be fully set forth in the description of the accompanying drawings in which:

Fig. 1, is a diagram of a series of floors of a department store illustrating diagrammatically my improved objective, transmission and observation units.

Fig. 2, is a diagrammatic detail sectional view through one objective transmission, and observation unit, upon an enlarged scale.

Fig. 3, is a plan of the observation unit of Fig. 2, illustrating the means to adjust the same to receive the image.

Fig. 4, is a diagram similar to Fig. 2, illustrating the use of prisms to transmit the light rays in place of reflectors.

Fig. 5 is a detail illustrating the use of photo-plates or screens to receive the images interchangeably with the eye-pieces.

The accompanying drawings illustrate the preferred embodiments of my invention in which 14, 15, and 16 represent different floors, rooms or departments of a store, bank, residence or other building which it is desired to protect with my improved apparatus. In each room or compartment preferably suspended from a point near the center of the ceiling is an objective unit comprising a lens 18, preferably a wide-angle lens, to converge or collect the light rays from a considerable section of the compartment as indicated by the dotted lines 17, indicating the limits of the space from which the light rays are collected and transmitted by the lens 18. The lens 18 is mounted preferably at an angle in a casing 19 which is rotatably mounted on ball bearings 20 and 21 carried by a stationary tubular member 22 projecting vertically downward from a hanger 22' at the ceiling to which it is attached. The casing 19 is provided with a grooved pulley 24 engaged by a round belt or cord 25 by means of which the casing 19 may be rotated and the objective lens 18 may be directed to any part of the room in which it is located.

The light rays collected by the objective lens 18 are concentrated upon a reflecting surface 26, and reflected therefrom to another reflecting surface 27 so placed as to reflect the rays up through the tube 22 and a lens 23 located in the upper portion thereof to the face of a reflector 28. The reflector 28 turns the rays at right angles and directs them within and substantially along the axis of a horizontal tube 29 to the observation compartment 30 or to a position as nearly as possible vertically above or vertically below the observation compartment where the rays are received upon another reflector 31 and directed either upwardly or downwardly as required within and substantially axially of a tube 32 to reach the observation compartment.

In the observation compartment the rays are received upon a reflector 33 and directed thereby from a vertical to a horizontal direction through a tube 34 to an observation board 35. A supporting frame comprising a member 36 rigidly attached to the board 35, and provided with slots 38 and 39, to enable the member 37 to be adjusted thereon vertically, and a slot 40 in the member 37 to enable member 37 to be adjusted laterally on member 36 where the members 36 and 37 are rigidly clamped by thumb screws 36′, provided for adjusting the members 37 into alignment with the pencil of rays from the reflector 33, even though such pencil of rays should not be projected concentrically along the axis of the tube 34. As illustrated in Fig. 2, a combination of lenses mounted in a tube 40′ and constituting together an eye-piece is adjustable endwise relative to the member 37 by means of a rack on tube 40′ and a pinion actuated by the knurled head 40″ to receive the pencil of light rays and to magnify and present them in suitable condition to form an image upon the eye of an observer located at the outer end of the eye piece. It is also designed to insert the lense 59 of a photographic camera interchangeably with the eye-piece into the member 37 to take photographic records, or if desired to throw the image upon a ground-glass or other translucent screen to enable the observer to have several such ground glass screens under observation at one time and to be in position to note anything of interest developing upon any one of said screens, or to be in a position to substitute an eye-piece and make a more minute investigation should anything suspicious or interesting develop on one of said screens.

In order to be able to rotatably adjust the several objectives from the point of observation I provide close to each eye-piece a hand wheel 41 on a shaft 42 upon which is mounted a pulley 43. A train of grooved idler pulleys 44 are mounted on stud shafts carried by the tubes leading from the objectives to the respective eye-pieces, or upon adjacent supports. The round belt or cord 25 is trained over the objective pulley 24 the driving pulley 43 and the several idler pulleys 44 and also over a pulley 45 from which a weight 46 is suspended to afford a continuous and sufficient tension on the belt 25 to insure movement of the objective when the hand wheel 41 is rotated.

The several objectives are located in the different rooms or floors to be placed under observation and the tubes leading therefrom to the eye-pieces are brought to adjacent positions upon an observation board 35 where each is provided with an eye-piece 40′ and a hand wheel 41.

The several reflectors mounted between the objective and eye-piece preferably comprise plates of metal backed glass or of metal with the silvered or reflecting surface in position to receive the light rays without the rays having to pass through the glass. Each of said plates is provided with a centrally located threaded stem 47 provided with a nut 48 by which the respective reflector plates are held in place with reference to the detachable plates 49. A series of three or more adjusting screws 50 are tapped through the plate 49 and bear upon the rear of the reflector plate to enable the reflector plate to be adjusted into such a plane as to receive and reflect the rays along the desired path, that is substantially along the axis of the tube to the next reflector or to the eye-piece.

In practice to primarily align and adjust the reflectors a pencil of light of small cross sectional diameter is thrown centrally through the objective to the first reflector 28, and this reflector adjusted until the light ray centers upon the next reflector 31 which in turn is adjusted until the light ray centers upon the next reflector 33 and ultimately upon the eye-piece, ordinary changes in temperature and similar factors may cause the light ray to deviate from the original position of adjustment particularly as it travels farther from the object and the light ray may thus be considerably deflected from the axis of the tube when it reaches the tube section 34 and hence I provide for conveniently adjusting the plate 37 carrying the eye-piece at any time so as to throw the light ray centrally into the eye-piece.

By providing a relatively long bearing for the objective, and roller bearings therefor I am enabled to rotate the objective with practically no lost motion and without materially disturbing the position of the light ray as it reaches the eye-piece.

In the modification Fig. 4, I have illustrated the use of a series of prisms 52, 53, 54, 55 and 56 and lens 54′ interposed between an objective 57, and an eye-piece 58, said prisms being adjustably mounted as heretofore described for the reflectors, and mounted with reference to the tubes, objective, and eye-piece in place of said several reflectors. In Fig. 5 I have illustrated a camera lens 59 and a photo-plate or translucent or ground-glass screen 60 adapted to be substituted interchangeably for the eye-piece.

As illustrated in Figs. 2 and 4 the rays after leaving the objective lens 18 come to a focus within the tube 22 and are then received by the lens 23, or 54′ the effect of which is to provide a pencil of rays which tapers continuously from said lens to the eye-piece. I contemplate however so proportioning the lens 23 or 54′ that the pencil of rays from said lens 23 or 54′ to the eye-piece shall be substantially parallel instead of tapering or conical, and hence the distance between the lens 23 or 54′ and the eye-piece will not affect the adjustment or necessitate lenses of different curvature depending upon the distance to be traversed from the objective to the eye-piece.

I also contemplate employing an electric lighting system in connection with the observation apparatus, comprising electric lamps 62 adjacent to the objectives controlled by electric circuits not shown and by individual switch levers 63 at the observation station whereby the respective rooms may be illuminated and their condition determined by a night-watchman, for instance. My improved observation apparatus may also be employed to advantage in detecting and guarding against fire.

The apparatus herein illustrated and described is capable of considerable modification without departing from the principle of my invention.

What I claim is:

1. An observation apparatus comprising an objective lens at the point to be observed to gather the light rays over a relatively wide angle into a pencil of substantially parallel rays, a conduit for the pencil of light rays leading from the objective to a point of observation, a plurality of elements to angularly direct the pencil of light rays, means to micrometrically adjust said angularly directing elements independently of each other, means to rigidly hold said elements to their adjusted positions, and an eye-piece at the point of observation.

2. An observation apparatus comprising an objective lens at the locality under observation to gather the light rays over a relatively wide angle into a pencil of substantially parallel rays, a light excluding conduit for the pencil of light rays leading from the objective to a point of observation, means at the angles of said conduit to angularly direct said pencil of rays, an eye-piece at the observation end of said conduit, and means to adjust said eye-piece transversely of the pencil of light rays to bring the eye-piece into alignment with said pencil of rays.

3. In an observation apparatus a conduit of angular pattern for a pencil of light rays from an objective to an observation station, means at the angle in said conduit to angularly direct said pencil of light rays, and means operable exteriorly of said conduit to angularly adjust said angularly directing means along a plurality of planes having only a point in common to cause said pencil of light rays to traverse said conduit substantially axially thereof, and means operable exteriorly of said conduit to rigidly secure said angularly directing element in its adjusted position.

4. An observation apparatus comprising a light excluding tubular conduit for a pencil of substantially parallel light rays, said tubular conduit having one or more angular bends therein and being provided at one end with an objective lens and at the opposite end with an eye-piece lens, a light directing member located at each angular bend in said conduit adapted to angularly direct said pencil of light rays, means operable to accurately independently angularly adjust said light directing member along two transversely disposed planes of adjustment to focus said pencil of light rays axially of the respective straight sections of said conduit, and means to rigidly lock said light directing members to their adjusted positions.

5. An observation apparatus comprising a series of objectives located in a plurality of independent compartments to collect light rays into independent pencils of substantially parallel light rays, independent angular conduits through which said respective light rays are transmitted to an observation compartment, and a plurality of screens in said observation compartment upon which different images are respectively thrown, and which screens and respective images thereon are adapted to be collectively observed.

6. An observation apparatus comprising a series of objectives located in a plurality of independent compartments to collect light rays into pencils of substantially parallel light rays, independent angular conduits through which said respective light rays are transmitted to an observation compartment, a plurality of screens in said observation compartment upon which different images from said respective objective compartments are respectively thrown, and which screens and respective images thereon are adapted to be collectively observed, and a plurality of independent eye-pieces through which said respective pencils of rays are adapted to be independently directed.

7. In an observation apparatus an objective, an eye-piece, a conduit for a pencil of substantially parallel light rays from said objective to said eye-piece having one or more angles therein, a light directing member at each angle of said conduit to angularly direct said pencil of light rays, each of said light directing members comprising a centrally supported directing member, exteriorly operable adjusting members to micrometrically adjust the angularity of said light directing member in a plane with the angle in said conduit, and means to rigidly lock said light directing member in its adjusted position.

8. In an observation apparatus an objective, an eye-piece, a conduit for a pencil of substantially parallel light rays from said objective to said eye-piece having one or more angles therein, a light directing member at each angle of said conduit to angularly direct said pencil of light rays, each of said light directing members comprising a centrally supported directing member, adjusting members to micrometrically adjust the angularity of said light directing member in a plane with the angle in said conduit and also in a plane substantially transversely to the angle in said conduit, and means to rigidly lock said light directing member in its adjusted position.

9. In an observation apparatus an objective, an eye-piece, a conduit for a pencil of substantially parallel light rays from said objective to said eye-piece having one or more angles therein, a light directing member at each angle of said conduit to angularly direct said pencil of light rays, each of said light directing members comprising a micrometrically adjustable light directing member, means operable exteriorly of said conduit to micrometrically angularly adjust said light directing member to maintain said pencil of light rays in a substantially axial position in said conduit, and means operable from the exterior of said conduit to rigidly lock said light directing member in its adjusted position.

In testimony whereof I have affixed my signature.

ROBERT E. FOSDICK.